Aug. 11, 1964  G. W. BLOOMQUIST  3,144,039
HYDRAULIC VALVE
Filed Oct. 18, 1961  3 Sheets-Sheet 1
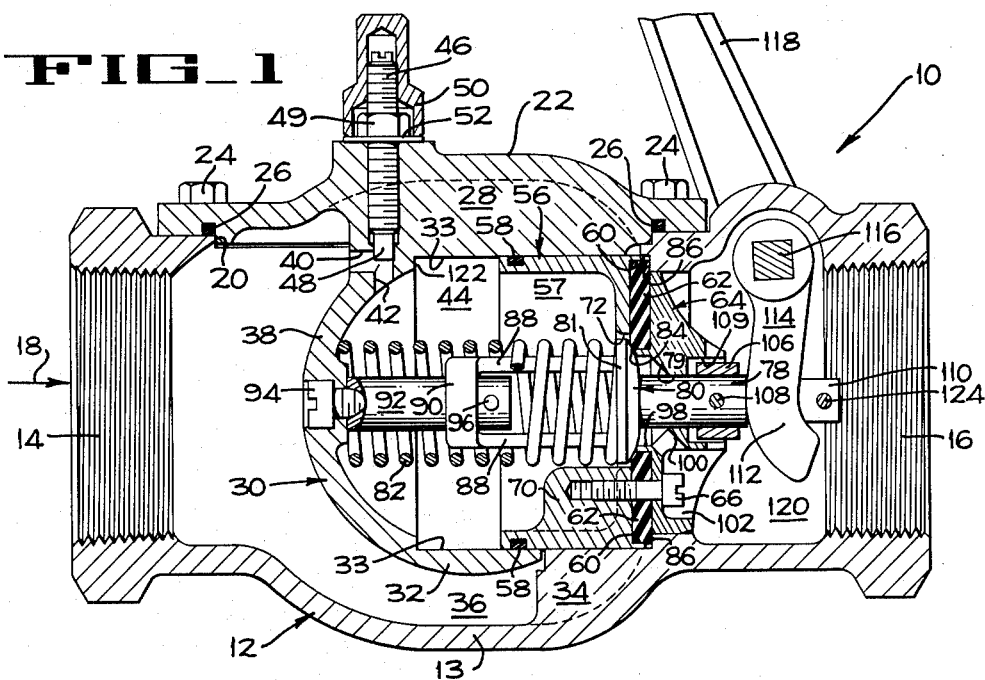
FIG_1
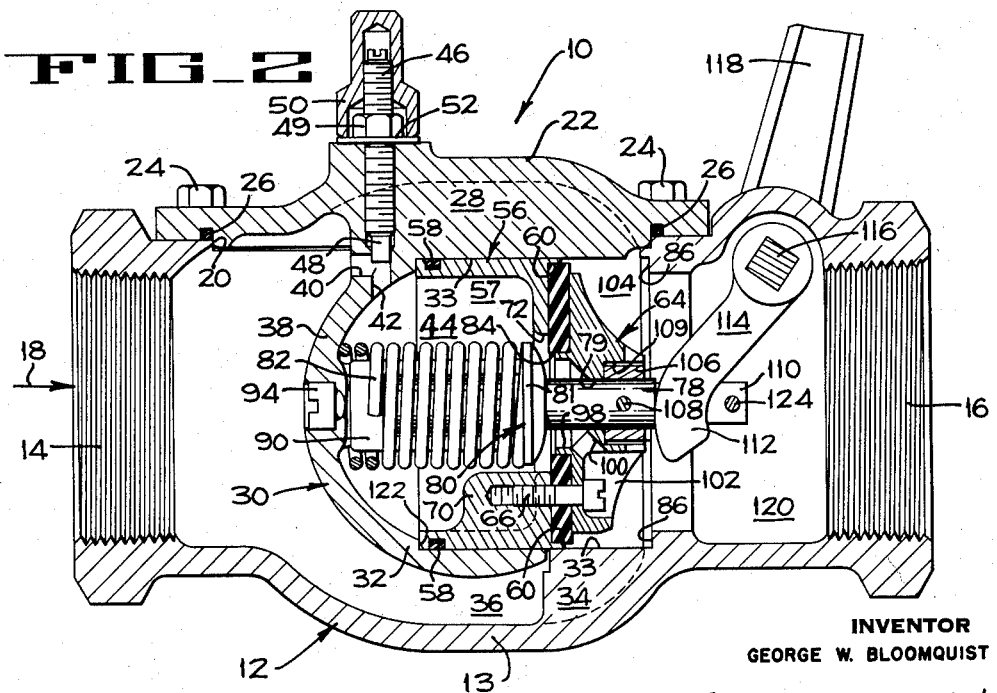
FIG_2
INVENTOR
GEORGE W. BLOOMQUIST
BY *Hans G. Hoppmeister*
ATTORNEY

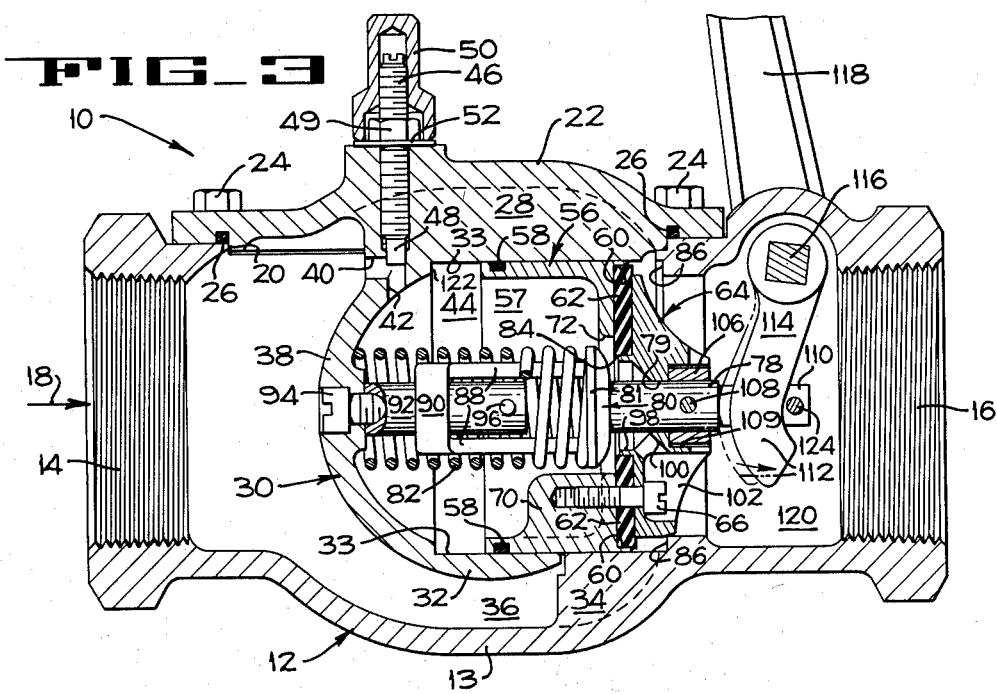
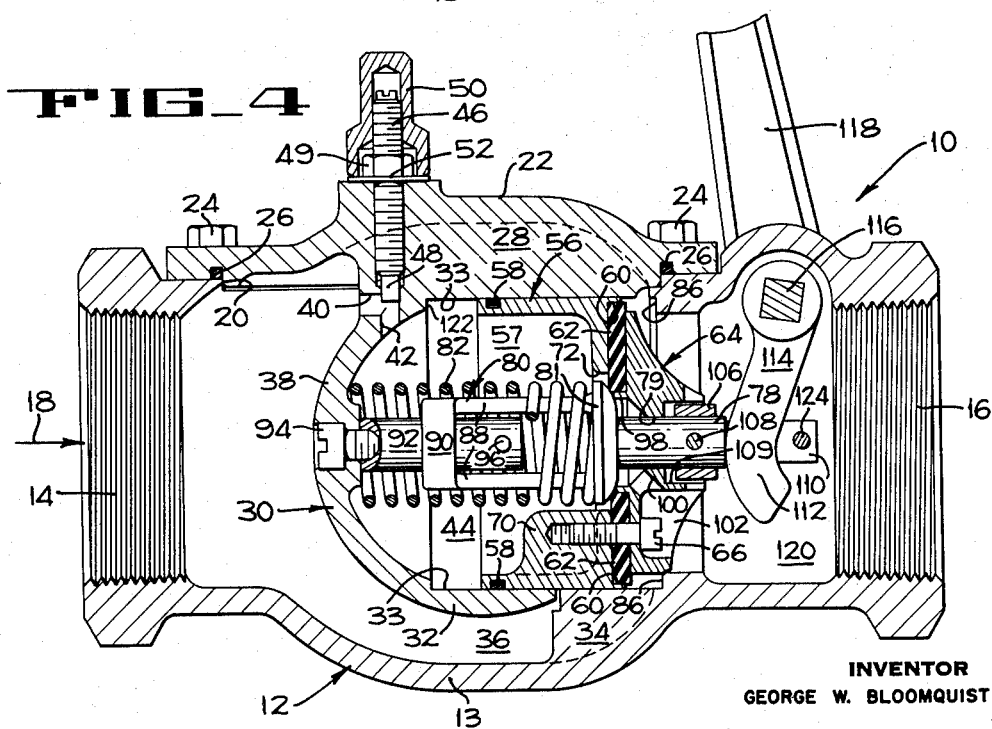

Aug. 11, 1964  G. W. BLOOMQUIST  3,144,039
HYDRAULIC VALVE
Filed Oct. 18, 1961  3 Sheets-Sheet 3
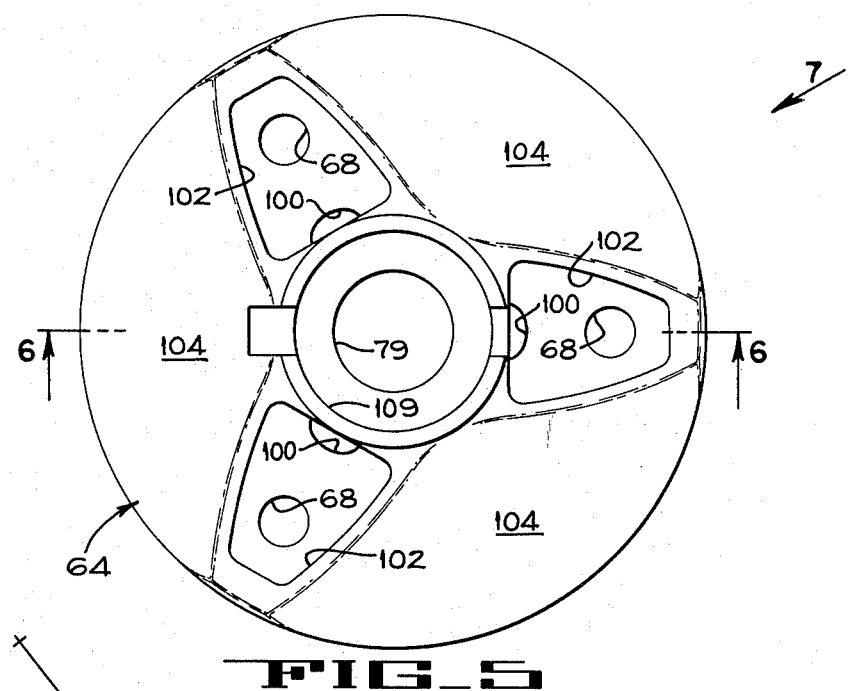
FIG_5
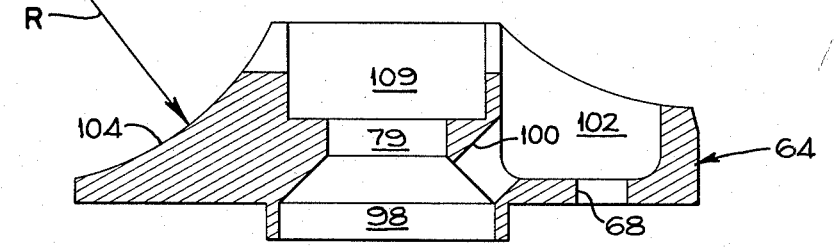
FIG_6
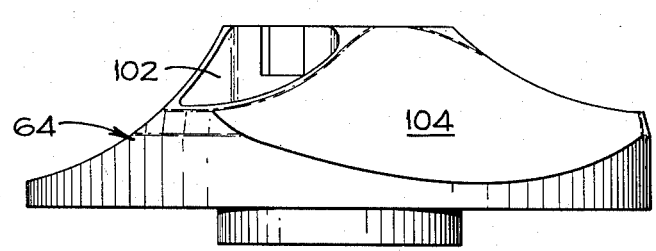
FIG_7
INVENTOR
GEORGE W. BLOOMQUIST
BY *Hans G. Hoffmeister*
ATTORNEY

United States Patent Office 3,144,039
Patented Aug. 11, 1964

3,144,039
HYDRAULIC VALVE
George W. Bloomquist, Long Beach, Calif., assignor, by mesne assignments, to FMC Corporation, San Jose, Calif., a corporation of Delaware
Filed Oct. 18, 1961, Ser. No. 145,915
2 Claims. (Cl. 137—222)

The present invention pertains to hydraulic valves in general and the valve of the present invention is also adapted for handling potentially dangerous liquids such as acid, gasoline, and the like. The valve of this invention is within this category because it incorporates a "deadman" control requiring that the operating handle of the valve be held manually in order for the valve to remain open, and because the valve will automatically close if the operator releases the handle.

One of the objects of the present invention is to provide an improved hydraulic valve which is manually opened, is automatically self-closing, and can be rapidly closed in an emergency.

Another object of the invention is to provide an improved self-closing valve having externally adjustable means for regulating its closing rate.

Another object is to provide an improved self-closing valve which closes at a controlled and relatively slow rate automatically, but which can be closed immediately upon actuation of an external control handle.

Another object of this invention is to provide an automatic valve which can be repaired or inspected without requiring removal of the valve from the flow line in which it is connected.

Still another object is to reduce the effect of reverse pressure surges on the movable valve parts.

Another object is to provide an improved valve wherein the number and complexity of its component parts have been minimized so that the valve is inexpensive and can be easily repaired.

Another object is to provide an improved pilot actuated valve wherein a single sealing ring performs a dual sealing function and eliminates one of the two sealing elements required in similar valves.

A further object of this invention is to provide a valve structure wherein the normal pressure differentials existing at different points within the valve are utilized to reduce the effort required of the operator in manually opening the valve and in holding the valve open.

Still another object is to prevent the valve from slamming shut when it is closed, and to render this antislamming function non critical as to the degree to which the valve was opened.

Other objects and advantages of the present invention will become apparent from the following description and the accompanying drawings, in which:

FIGURE 1 is a longitudinal section of the valve of the present invention and illustrates the valve in closed condition.

FIGURE 2 is a section similar to FIGURE 1 but showing the operational parts of the valve in the position they assume when the valve is fully opened.

FIGURE 3 is a longitudinal section showing the valve in a position wherein the valve has been held partially open and the handle has been quickly moved to release the valve.

FIGURE 4 is a longitudinal section at a critical stage in the valve closing process that was initiated in FIG. 3.

FIGURE 5 is a plan of the valve cap member of the invention.

FIGURE 6 is a transverse section of the cap member taken on lines 6—6 of FIGURE 5.

FIGURE 7 is a side elevation of the cap member viewed in the direction of the arrow 7 on FIGURE 5.

The valve 10 (FIGURE 1) of the present invention includes a hollow housing 12 including a body portion 13 which is of generally circular cross section and is provided with aligned, internally threaded inlet and outlet end portions 14 and 16, respectively. The threaded end portions adapt the valve for installation in a flow line (not shown) which should be made so that flow through the valve 10 is in the direction indicated by the arrow 18. The housing body portion 13 is provided with an access opening 20 in one side thereof which is closed by a removable cover 22, which is considered to be a removable part of the housing. The cover 22 is secured to the valve housing body portion 13 by a plurality of bolts 24 and a fluid-tight seal is effected between the housing and the cover by means of a sealing ring 26 that is disposed in an annular groove in the inner side of the cover. A thin, central, axially extending web 28 depends from the cover 22, and the web mounts a valve assembly including fixed and movable parts and indicated generally at 30, by means of which passage of fluid through the valve is controlled.

The valve assembly 30 includes an open ended cylindrical body 32 having a cylindrical bore 33 that is disposed coaxially of the valve housing 12. Three narrow webs 34, only one of which is shown, are spaced apart 90 degrees and project inward from the housing 12 adjacent the downstream end of the body 32 to guide a piston valve as will be presently made clear. Except for the web portions 28 and 34, a uniform circumferential flow passage 36 is formed completely around the body 32. The upstream end of the cylindrical body 32 is closed by a hemispherical wall 38, and the downstream end of the body 32 is open.

Intercommunicating metering ports 40 and 42 are formed in the wall 38 of the body 32 in order to provide for controlled flow of fluid from the upstream side of the valve into a hollow control chamber 44 formed within the body 32. The rate at which fluid enters the control chamber 44 is adjustable by means of a needle valve 46 which extends through a threaded aperture in the cover 22, and a metering pin 48 controls flow of fluid from port 40 to port 42. A locknut 49 secures the needle valve 46 in its adjusted position. In order to prevent fluid from escaping from the valve 10 along the threaded shank of the needle valve 46, the upper end portion of the valve 46 is sealed to the cover 22 by means of an internally threaded nut 50 which is screwed onto the shank of the valve 46, and by a gasket 52 interposed between the nut and the cover 22. The needle valve 46 regulates the closing rate of the valve 10, as will be described presently.

The valve assembly 30 includes a piston valve indicated generally at 56 and which includes a cup-shaped piston portion 57 that is axially slidable in the cylindrical bore 33 in the body 32. A sliding seal is effected between the piston and the cylinder bore 33 by a sealing ring 58 that is mounted in a circumferential groove in the piston portion 57. The downstream end of the piston portion 57 is provided with a circular recess 60, in which is mounted a flat, centrally apertured resilient sealing disc 62. The sealing disc 62 is secured to the piston portion 57 by means of a hydraulic shock preventing cap member 64, which is bolted through the sealing disc to the piston portion 57 by means of bolts 66 (only one being shown). The bolts extend through three equally spaced apertures 68 in the cap (FIG. 5). A plurality of webs 70 (only one of which is shown) on the inside of the piston reinforce the piston and are provided with threaded apertures into which the bolts 66 are screwed. The radially inner portion of the sealing disc 62 (FIG. 1) extends inwardly beyond the periphery of a central aperture 72 that is formed in the downstream end of the piston portion 57.

A pilot valve indicated generally at 80 is mounted in the piston valve 56. The valve stem 78 for the pilot valve extends slidably through a bore 79 in cap 64. A pilot valve head or disc 81 is formed integrally on the axially inner end of the valve stem. A pilot valve compression spring 82 is interposed between the hemispherical wall 38 and the pilot valve disc 81, so that the pilot valve 80 is continuously urged to its closed position against the piston valve, regardless of the axial position of the piston valve 56. When the piston valve 56 is in its closed position (FIG. 1), the pilot valve disc 81 is pressed against the sealing disc 62 on the piston valve, so as to close off a central aperture 84 formed in the sealing disc 62. When the pilot valve disc 81 engages the sealing disc 62, the pilot valve spring 82 also urges the piston valve 56 to its closed position. When the piston valve is closed, the downstream peripheral face of the sealing disc 62 on the piston valve sealingly engages a valve seat 86 which is formed by a circumferential internal shoulder in the housing 12.

Projecting from valve disc 81 into control chamber 44 are spaced legs 88 joined by an annular end web 90. The valve spring 82 is guided by the legs 88. The annular end web 90 is slidably mounted on a stud 92 that is secured to the hemispherical wall 38 of the body 32 by means of a bolt 94. A transversely extending pin 96 is mounted near the free end of the stud 92 so as to limit axial movement of the pilot valve on the stud 92 during initial assembly of these parts.

The hydraulic shock preventing circular cap member 64 (FIGS. 5-7) of the piston valve 56 is provided a central port 98 of larger diameter (FIG. 1) than the pilot valve stem or actuating rod 78. The cap 64 is also provided with three bleeder ports 100 that communicate with the port 98 in the valve cap, and hence the ports 100 communicate with control chamber 44. Bleeder ports 100 each open into a cavity 102 which is formed around the head of each bolt 66 at the outer face of the cap (see FIGS. 1 and 5). In addition, the cap member 64 is formed with three equally spaced concave surfaces 104 formed in its outer surface for the purpose of streamlining fluid flow from the circumferential passage 36 to the discharge end of the valve 10, and for other purposes as will later be described. The concave surfaces 104 lie in a cylinder having a radius R (FIG. 6), the axis of the cylinder being tangent to a circle centered on the axis of the valve cap 64. The surfaces 104 may also be formed as portions of conic sections other than that of a circle.

The piston valve 56 is manually opened by means including a collar 106 (FIG. 1) secured to the pilot valve stem or actuating rod 78 by a pin 108. The collar is disposed in a cylindrical socket 109 formed in the cap 64. Projecting axially from valve stem 78 are spaced parallel legs 110 (only one being shown) which form a clevis that embraces the free arcuate end portion 112 of a valve actuating lever 114. The lever 114 is secured to a square portion of a transversely extending rock shaft 116, which shaft extends through a side wall of the housing 12 and is sealed thereto to permit rotation of the shaft, while preventing escape of liquid along the shaft. Details of this shaft mounting and seal are not part of the present invention. The outer end portion of the rock shaft 116 is secured to an actuating handle 118 for controlling the valve assembly 30 so that the valve 10 may be either manually opened or closed in the manner next described.

When the actuating handle 118 is moved to turn the rock shaft 116 from the FIGURE 1 position (fully closed) to the FIGURE 2 position (fully open), the arcuate end portion 112 of the actuating lever 114 moves the pilot valve stem 78 upstream so that the valve disc 81 of the pilot valve 80 is moved away from the sealing disc 62, to open the port 98 formed in cap member 64. Because the control chamber 44, that is disposed behind the piston valve, contains pressurized liquid urging the piston valve 56 downstream, and since there is no liquid under pressure on the downstream side of the piston when the piston valve is closed, the piston valve initially remains in its closed position. However, once the pilot valve 80 is cracked from its seat, liquid within the control chamber 44 escapes through the port 98 in the cap 64, and through the bleeder ports 100, to relieve the pressure within the chamber 44. The effects of this action will now be explained.

The valve of this invention makes use of the pressure differentials which normally exist across the main valve port or valve seat of the valve when the valve is open and conducting fluid. In the present valve, the valve ports are formed so that this pressure differential is intentionally increased, and this augmented pressure differential is used to facilitate manual opening of the valve, as well as holding the valve in any open position. Furthermore, the valve can be adjusted to close rapidly, without chattering or slamming shut. Means by which the foregoing results are accomplished include the particular construction of the cap member 64, and the effective sizes of the metered inlet ports 40, 42 for control chamber 44, relative to the size of bleeder ports 100 that bleed the control chamber.

The cavities 102 (FIGS. 5-7) in the cap member 64 lie near a flow zone where the fluid, when the piston valve is open, is accelerated due to its flow from the relatively large circumferential passage 36 into a more narrow passage formed between the piston valve and its seat 86. Because of this throttling action, when the piston valve is open, the fluid discharged from the valve is at a slightly lower pressure than the fluid entering the valve. In addition, part of the fluid approaching the discharge outlet 16 flows along a devious path into and out of the cavities 102. The cavities 102, therefore, always contain fluid, and when the piston valve is open, and due to turbulence in the cavities, such fluid is at a lower pressure than the fluid in the adjacent portions of the outlet passage 120. The reduced fluid pressure in the cavities assists in the valve operation.

Returning to a description of the action that takes place during opening of the piston valve, as previously described, the first stage is that of manually moving the pilot valve disc 81 away from its seat 84 in the main valve sealing disc 62. This opens the bleeder ports 100 to the control chamber 44. This bleeds high pressure fluid out of the control chamber 44 to the cavities 102. This transfer of fluid out of the control chamber 44 occurs faster than fluid can enter the chamber through the metered inlet ports 40 and 42, so that control chamber pressure acting on the piston valve is reduced. Thus, when collar 106 on stem 78 bottoms against the cap 64, manual movement of the piston valve to open the same is easily accomplished, because the pressure within the control chamber 44 has been reduced by the differential flow action through the metering ports 40, 42 and the bleeder ports 100.

Once the piston valve has been opened, fluid flow past the cap 64 and in the cavities 102 maintains low pressure or turbulent areas on the downstream side of the cap as described, so that bleeder ports 100 continue to bleed fluid from the control chamber.

It has been found that by properly adjusting the metered inlet flow through the metering ports 40 and 42 by means of valve 46, the piston valve will tend to remain in its open position, even though it is not manually held open. In fact, if the pilot valve spring 82 were omitted, the handle could be released and the piston valve would remain open. Actually, the pilot valve spring is required in order to provide the self-closing feature of the valve. Nevertheless, the hydraulic balance of the piston in open poistions may be very nearly perfect, as a direct result of the particular configuration of the cap member 64 in conjunction with the porting and other structural details herein shown and described.

Thus, in actual operation, the effort required to unseat piston valve 56 from valve seat 86 is minimized and the valve opening operation is smooth, and is opposed primarily by the pilot valve spring 82 and not by fluid pressure within the control chamber.

Continued movement of the actuating handle 118 (FIG. 2) in the valve opening direction fully compresses the pilot valve spring 82 between the disc 81 and the hemispherical wall 38, and the piston valve 56 is forced axially into the chamber 44 until the piston valve is fully opened. As seen in FIG. 2, opening motion of the piston valve is limited by a shoulder 122 formed at the upstream end of the cylindrical bore in the body 32 that receives the piston 56.

When the valve is opened, the piston valve 56 will remain unseated only so long as the actuating handle 118 is held. When the handle is released, the pilot valve spring 82 will first seat the pilot valve disc 81 against the sealing disc 62, and will then urge the pilot valve toward its closed position. When the pilot valve is seated, the pressure in control chamber 44 will build up by flow in the control chamber through the metering ports, and the piston valve will automatically move toward its closed position without further attention, until the valve resumes its closed position of FIGURE 1.

The manner in which the valve acts to prevent chatter and slamming during the closing operation will now be described. Assume that the valve has been partially opened to the position shown in FIG. 3, and has been held open by the handle while in position shown in broken lines in that figure. The pilot valve is open, and pressures on the opposite faces of the piston valve 56 are substantially balanced, as previously described. Assume, by way of explanation that the handle is quickly moved to the full line position of FIG. 3, so that neither the pilot nor the piston valve ports have had time to move appreciably. Mechanically, with the handle in the solid line position of FIG. 3, there is nothing to prevent the pilot valve from closing under the force of spring 82, nor is there anything to prevent the piston valve from moving with the pilot valve. Actually, however, the piston valve is substantially hydraulically balanced and tends to stay put, or move slowly, until the pilot valve closes. The force of the pilot valve spring 82 can now shift the pilot valve so that it seats and closes off the port 98 in the piston valve, as seen in FIG. 4. Since the piston is sealed in its bore, and since port 98 in the piston valve cap is now closed off, piston valve 56 is urged toward its closed position under the force of spring 82, but it can only close at a rate determined by the fluid flow through the metering ports 40 and 42 into the control chamber 44. The piston valve will not move so as to increase the volume of the control chamber 44 any faster than fluid can be supplied to the control chamber, because otherwise the piston valve would draw a vacuum in the control chamber. Thus, after the pilot valve seats as shown in FIG. 4, the automatic closing of the valve under force of pilot valve spring 82, will be retarded and the rate of closing is governed by fluid flow through the metering ports 40 and 42, as determined by the externally adjustable needle valve 46. If desired, adjustment of the needle valve can be made while the valve is operating to attain the desired closing rate.

In connection with the described automatic valve closing operation, it is noted that the cap member 64 is configured so that even though the needle valve 46 might be set to effect a fairly rapid closing rate, the valve will not chatter and slam shut, a condition which has previously been troublesome in rapidly closing valves. This action results from the arcuate concavities 104, which, as the cap 64 moves into the large port formed by the valve seat 86, receive the impact of a relatively high velocity flow, and the concavities change the direction of flow from generally radial to generally axial flow. The reaction of such flow on concavities 104, when its direction is changed as described, has axial components that act in a manner to partially counteract the closing force and hence prevent the valve from slamming to its closed position.

As piston valve 56 closes, since the influx of liquid through the metering port is offset by an increase in control chamber volume due to closing motion of the piston valve, the pressures against each face of the piston valve 56 are substantially balanced and remain balanced during the automatic closing operation of the valve. Thus, the piston 56 is sensitive to reverse pressure surges which may rebound from the downstream side of the valve. However, such surges are deflected radially outwardly by the concave faces 104, which convert the surges to velocity heads, the net effects of which are partially converted to ineffective radial forces. Thus, chatter of the valve due to surge impulses is greatly reduced, if not entirely eliminated. The concavities 104 of the piston valve cap also enhance the flow characteristics when the valve is fully open because they streamline fluid flow and reduce turbulence that would otherwise occur at these areas if the outer face of the piston were flat. This reduction in turbulence also facilitates holding the valve open with the actuating handle 118 because low pressure zones on the downstream side of the piston (except the turbulent low pressure zones in the cavities 102) are minimized. Excessive turbulence at the face of the piston valve cap would cause low pressure areas that tend to cause the valve to close, thereby increasing the force required to hold it open.

If the valve 10 is in its fully opened position (FIG. 2) and an emergency requires immediate forced closing of the valve, the operator moves the handle 118 to its extreme opposite position. The arcuate end 112 of the actuating lever 114 thereby engages a transverse pin 124 which is secured between the open end portion of the legs 110 on the pilot valve stem. The pilot valve is now rapidly closed, after which manual closing force is applied to the piston valve. However, closing motion of the piston valve 56 is resisted by the throttling action past needle valve 46, so that an instantaneous and abrupt manual closing of the valve is prevented. However, a closing force can be applied to the handle 118 and pin 124 sufficient to draw a vacuum in the control chamber, and cause an earlier than normal closing of the valve. After this forced closing of the piston valve, fluid continues to rapidly enter the chamber 44 through the ports 40 and 42 and the resultant pressure build up behind the piston valve soon permits the valve spring 82 to hold the piston valve closed. For a given setting of the needle valve 46, the more rapidly it is desired to manually force the piston valve closed, the greater is the force that must be exerted on the handle. After the piston valve is closed, and the control chamber 44 becomes filled with liquid, the handle 118 can be released. The valve will remain in its closed position until the handle is moved to open the pilot valve and piston valve in the manner previously described.

When the moving parts of the valve 10 require replacement or repair, the valve housing 12 need not be removed from the flow line into which it is connected. It is merely necessary to shut off flow entering the upstream end of the valve and then to remove the bolts 24 that retain cover 22 on the valve body 13, whereupon the entire valve assembly 30 can be withdrawn from the valve body. It will be seen that by tilting the cover 22 during its removal, with the valve held in the open condition shown in FIGURE 2, the legs 110 on the valve stem 78 will readily disengage from the curved end 112 of the lever 114, so that the valve assembly 30 can be removed as mentioned.

The valve of the present invention employs a particular configuration of the cap member 64 (concavities 104) which improves its flow characteristics. In improving the flow characteristics it was found that the shape of the cap member produced an unexpected result in that it reduces the force required to manually hold the valve in its open positions. Investigation showed further that the cavities 102 in the valve cap produce a marked low pressure effect which, if applied to the piston chamber 44 by ports such as bleeder ports 100, further reduced the force required to hold the valve open. Furthermore, by providing means for adjusting the relative sizes of the metering passages 40, 42, and the bleeder ports 100, it was found possible to reduce the pressure in control chamber 44 to the point wherein the pressure in chamber 44 could be made so low as to actually balance the external pressure on the piston valve, which eliminated the major part of the work of opening the valve.

As to the valve closing action, prior valves have depended on downstream movement of the piston valve to produce a suction effect on the upstream side of the valve, in order to provide a low pressure zone on the upstream side and so prevent the valve from slamming shut. When such valves are only partially open, only a small amount of closing motion of the valve is available to generate the desired low pressure zone on the upstream side of the valve. Thus, there is a limiting partially open position of the valve, and if the valve is not opened at least to this limiting position the valve will slam closed because prevention of slamming is dependent upon the availability of the aforesaid certain minimum amount of piston movement.

The valve of the present invention has no such limiting position, because immediately the pilot 80 unseats from the sealing disc 62, the bleeder passages 100 bleed liquid from chamber 44, and the piston valve is hydraulically balanced. When the pilot valve is seated to close the piston valve, the automatic self-balancing hydraulic checking actions begins, and the piston valve will not slam closed when the handle 118 is released. This is true even though the valve was not opened to any great extent. Accordingly, in the valve of the present invention there is no "critical" position of the piston valve where the valve will violently close unless it is opened at least far enough to reach such position.

Some of the advantages of the valve of the present invention are summarized as follows:

(1) The controlled automatic closing rate can be precisely adjusted while the valve is operating. The valve will not slam shut during automatic closing.

(2) The valve can be closed rapidly, as in an emergency, by manipulating the control handle.

(3) When the valve is manually shut, the pressures acting inside and outside the cylinder are temporarily unbalanced, whereby the valve cannot be manually slammed shut and will not chatter.

(4) The work required to open the valve and to hold it open is minimized.

(5) The hydraulic shock preventing cap member on the downstream end of the piston enhances fluid flow toward the discharge side of the valve when the valve is open, and dissipates pressure surges or shock waves originating downstream of the valve so as to minimize or prevent valve chatter.

(6) A valve structure is provided which enables a single flat sealing member to accommodate dual main valve and pilot valve sealing functions.

(7) The valve can be inexpensively manufactured, is rugged and compact, and is easy to maintain.

(8) The valve can be disassembled for maintenance without removing the valve housing from the flow line.

While a particular embodiment of the present invention has been shown and described, it will be understood that the valve is capable of modification and variation without departing from the principles of the invention and that the scope of the invention should be limited only by the scope and proper interpretation of the claims appended hereto.

The invention having thus been described, that which is believed to be new and for which protection by Letters Patent is desired, is:

1. In a hydraulic valve having a housing formed with inlet and outlet openings and a valve seat between said openings, an internal piston valve in said housing carrying a sealing member for engagement with said valve seat; the improvement comprising a hydraulic shock preventing member secured to the downstream end of the piston valve and having a substantially closed downstream end surface, said end surface being formed with a plurality of concave faces extending radially inward from the outer circumferential downstream edge of the piston valve, said concave faces lying substantially in cylinders with axes tangential to a circle centered on the longitudinal axis of the piston valve, said shock preventing member having a cavity in the downstream end thereof between the adjacent ones of said concave faces, each of said cavities communicating with the interior of said piston valve through a passage formed in said shock preventing member, said cavities providing devious flow paths for fluid transmitted through the valve and around the piston whereby the pressure of fluid in said cavities is reduced and said passages effect a reduction of the pressure fluid acting against the interior surfaces of said piston valve.

2. A hydraulic valve comprising a housing having an inlet, an outlet and means forming a control chamber opening toward said outlet; a piston valve in sliding, sealing engagement with the wall of said chamber for substantially closing the chamber, said piston valve having a plurality of circumferentially spaced, smooth, concave outer faces, a generally axial turbulence-creating cavity formed in said piston valve at the spaces between said faces, and terminating axially inward of the faces, bleeder ports in said piston valve establishing communication between the axially inner end of each cavity and said control chamber, a pilot valve in said piston valve for closing said bleeder ports in the piston valve, spring means for closing said valves, a metering liquid inlet port between said housing inlet and the control chamber, and manually operable means for first opening said pilot valve and then said piston valve.

References Cited in the file of this patent

UNITED STATES PATENTS

| | | |
|---|---|---|
| 1,325,223 | Wilkinson | Dec. 16, 1919 |
| 2,172,855 | Siegert | Sept. 12, 1939 |
| 2,319,069 | Krone | May 11, 1943 |
| 2,357,657 | Jensen | Sept. 5, 1944 |
| 2,604,905 | Myer | July 29, 1952 |
| 2,729,419 | Briede | Jan. 3, 1956 |

FOREIGN PATENTS

| | | |
|---|---|---|
| 207,004 | Great Britain | Nov. 22, 1923 |